United States Patent
Dusad et al.

(10) Patent No.: US 10,075,250 B2
(45) Date of Patent: Sep. 11, 2018

(54) BIAS REMOVAL IN PRBS BASED CHANNEL ESTIMATION

(71) Applicant: TEXAS INSTRUMENTS INCORPORATED, Dallas, TX (US)

(72) Inventors: Shagun Dusad, Bangalore (IN); Nagarajan Viswanathan, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 2 days.

(21) Appl. No.: 15/395,783

(22) Filed: Dec. 30, 2016

(65) Prior Publication Data

US 2018/0191472 A1 Jul. 5, 2018

(51) Int. Cl.
*H04B 17/309* (2015.01)
*H04L 1/24* (2006.01)
*H04L 25/02* (2006.01)
*H04B 17/336* (2015.01)

(52) U.S. Cl.
CPC ........ *H04B 17/336* (2015.01); *H04B 17/309* (2015.01); *H04L 1/244* (2013.01); *H04L 25/0202* (2013.01)

(58) Field of Classification Search
CPC ....... H04L 1/244; H04L 25/0202; H04L 1/24; H04L 1/242; H04L 1/248; H04B 17/30; H04B 17/309; H04B 17/336
See application file for complete search history.

(56) References Cited

U.S. PATENT DOCUMENTS

| | | | |
|---|---|---|---|
| 7,215,698 B2 * | 5/2007 | Darby | G01S 5/0081 132/260 |
| 7,391,804 B2 * | 6/2008 | Shattil | H04B 7/0613 375/140 |
| 2014/0294124 A1 * | 10/2014 | Atungsiri | H04L 1/0017 375/340 |

* cited by examiner

*Primary Examiner* — Betsy Deppe
(74) *Attorney, Agent, or Firm* — John R. Pessetto; Charles A. Brill; Frank D. Cimino

(57) ABSTRACT

A system includes a pseudorandom binary sequence (PRBS) generator configured to generate a first PRBS and a second PRBS and an exclusive-OR logic configured to exclusive-OR the first PRBS and the second PRBS to compute a third PRBS. The system also includes an adder, a correlator and a corrector. The adder adds the third PRBS to input data to compute summed data for transmission of the summed data across the channel. The correlator computes the exclusive-OR of the first PRBS and the second PRBS to reproduce the third PRBS and correlates output data from the channel to the reproduced third PRBS to compute a channel gain error and a channel memory error. The corrector extracts the input data from the output data from the channel using the computed channel gain and memory errors.

7 Claims, 1 Drawing Sheet

BIAS REMOVAL IN PRBS BASED CHANNEL ESTIMATION

BACKGROUND

Many systems involve sending data from a source to a destination through a channel. The channel may introduce gain error and memory error to the data being transmitted thereby resulting in a degradation of the signal-to-noise ratio. The accurate recovery of the source input data to the channel at the output of the channel can be difficult.

SUMMARY

In an embodiment, a system includes a pseudorandom binary sequence (PRBS) generator configured to generate a first PRBS and a second PRBS and an exclusive-OR logic configured to exclusive-OR the first PRBS and the second PRBS to compute a third PRBS. The system also includes an adder, a correlator and a corrector. The adder adds the third PRBS to input data to compute summed data for transmission of the summed data across the channel. The correlator computes the exclusive-OR of the first PRBS and the second PRBS to reproduce the third PRBS and correlates output data from the channel to the reproduced third PRBS to compute a channel gain error and a channel memory error. The corrector extracts the input data from the output data from the channel using the computed channel gain and memory errors.

In another embodiment, a system includes a PRBS generator configured to generate a first PRBS and a second PRBS. The system also includes a logic circuit coupled to the PRBS generator. The logic circuit is configured to generate a third PRBS from first PRBS and the second PRBS. The system includes a channel configured to receive input data combined with the third PRBS and to output channel output data. A correlator is included that is coupled to the PRBS generator and is configured to receive the first PRBS and the second PRBS, reproduce the third PRBS using the received first PRBS and the received second PRBS, and correlate the output data from the channel to the reproduced third PRBS to compute a channel gain error and a channel memory error. A corrector is coupled to the correlator and is configured to estimate the input data from the output data from the channel using the computed channel gain and memory errors.

In yet another embodiment, a method includes generating a first PRBS, generating a second PRBS, and generating a third PRBS using the first PRBS and the second PRBS. The method further includes injecting the third PRBS into a channel along with input data, providing the first and second PRBS to a correlator, reproducing, by the correlator, the third PRBS using the provided first PRBS and the provided second PRBS, correlating the output data from the channel to the reproduced third PRBS to compute a channel gain error and a channel memory error, and correcting the output data from the channel using the computed channel gain error and memory error to estimate the input data.

BRIEF DESCRIPTION OF THE DRAWINGS

For a detailed description of various examples, reference will now be made to the accompanying drawings in which.

DETAILED DESCRIPTION

As noted above, channels can introduce gain and memory error. Such errors may cause a degradation to the signal-to-noise ratio (SNR). Various techniques can be employed to estimate the gain error and the memory error of the channel to thereby counteract the SNR degrading effects. Such techniques involve the use of pseudorandom binary sequences (PRBS). A PRBS may refer to a binary sequence that, while generated with a deterministic algorithm, is difficult to predict and exhibits statistical behavior similar to a truly-random sequence. A PRBS pattern can be added to the input data at the input of the channel, and the channel's output signal is then correlated with the same PRBS pattern to estimate the channel's gain and memory. Once the channel's gain and memory errors are estimated, such errors can be removed from the output signal of the channel. Unfortunately, in some systems, the PRBS values may couple through unwanted paths into the channel. It can be very difficult to ensure that PRBS is not added through undesired pathways into the channel.

The disclosed embodiments address these issues by sending different PRBS into the channel from what is generated by the PRBS generator and sent to a correlator. First and second PRBS values are generated and the first and second PRBS values are uncorrelated to each other. The first and second uncorrelated PRBS values are then exclusive-OR'd to produce a third PRBS value that is uncorrelated to either of the input PRBS values. The resulting third PRBS value is sent into the channel along with the input data. The first and second PRBS values are provided to the correlator which also performs the exclusive-OR operation on the first and second PRBS values to produce the third PRBS value. The correlator correlates the output of the channel with the third PRBS value and the first and the second PRBS values to correct for the effects of channel gain, channel memory, and any coupling of PRBS values into the channel through pathways other than the input of the channel at which the input data is inserted.

Figure 1:
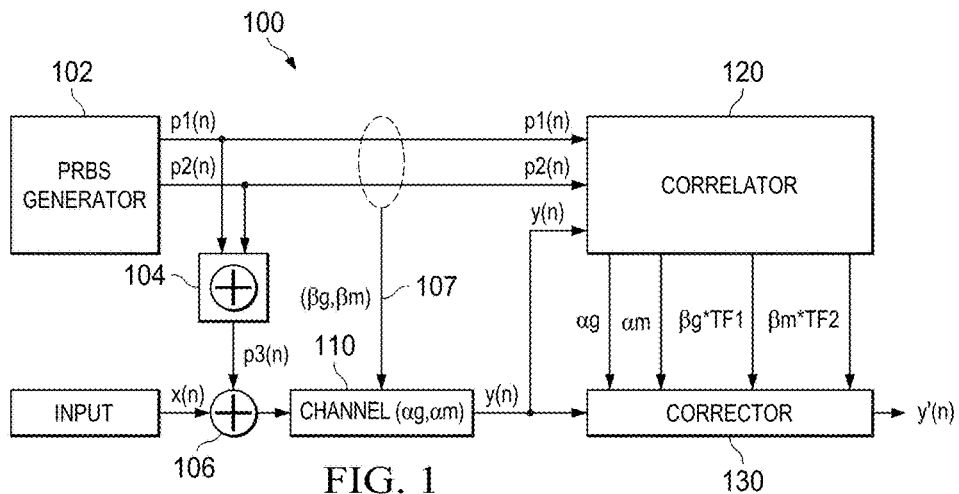
FIG. 1 shows a system in accordance with various examples.

FIG. 1 shows an example of a system 100 (e.g., a communication system) in which input data, x(n), is transmitted across a communication channel 110 and corrected based on the principles described herein. The channel may be implemented as part of any type of electronic system such as an analog-to-digital converter (ADC). The channel 110 may comprise a plurality of conductors (e.g., wires, traces on a circuit board or die, etc.), drivers, receivers, amplifiers, residue stages, and the like. The system also includes a PRBS generator 102, exclusive-OR logic 104, an adder 106, a correlator 120, and a corrector 130. These components can be formed from discrete circuit components in some embodiments, or implemented in a controller executing program instructions such as firmware.

The PRBS generator 102 generates PRBS values p1(n) and p2(n). The PRBS values p1(n) may form a first PRBS, and the PRBS values p2(n) may form a second PRBS. The PRBS generator 102 may comprise, for example, one or more linear feedback shift registers (e.g., a Fibonacci linear feedback shift register, a Galois linear feedback shift register, etc.). A linear feedback shift register, as used herein, may refer to a shift register whose input bit is a linear function of its previous state.

In some embodiments, the PRBS generator 102 generates a sequence of random values and some of the values are selected to be p1(n) and other values (e.g., every other value) selected to be p2(n) such that p1(n) and p2(n) are uncorrelated. For example, p1(n) may be a delayed version of p2(n), or vice versa. A property of a PRBS generator is that the PRBS sequence is uncorrelated to its delayed version so that the correlation between p1(n) and p1(n-M) is zero where M is an integer greater than 0. The values of p1(n) and p2(n) are provided to the exclusive-OR logic 104 which computes the exclusive-OR operation on the p1(n) and p2(n) values thereby generating third PRBS values p3(n). The values of p3(n) are uncorrelated to the p1(n) and p2n). The p3(n) values are added by adder 106 to the input data x(n) and injected into the channel 110 as shown.

As noted above, the channel may have a gain and memory error for the input data designated as $\alpha g$ and $\alpha m$, respectively. The p1(n) and p2(n) values may be inserted into the channel at 107 via an undesirable pathway (i.e., a pathway other than through the adder 106 to the input of the channel. When p1(n) and p2(n) are sent from PRBS generator 102 to correlator block 120, they couple to channel 107 because the channel 107 is not isolated. $\beta g$ denotes the gain portion of the coupling and $\beta m$ denotes the memory portion of the coupling. The output of the channel is designated as y(n) and is given by:

$$y(n)=\alpha g[p3(n)+x(n)]+\alpha m[p3(n-1)+x(n-1)]+\beta g^*TF1^*[p1(n)+p2(n)]+\beta m^*TF2^*[p1(n-1)+p2(n-1)]$$ (Eq. 1)

where p3(n-1), p1(n-1), and p2(n-1) represent the immediately previous values of p3, p1, and p2, respectively, and TF1 and TF2 are scaling factors. The first term in Eq. 1 is $\alpha g[p3(n)$ and $x(n)]$ and represents the output of the channel from the combination of the current input x(n) and the current PRBS value p3(n). The second term in Eq. 1 is $\alpha m[p3(n-1)$ and $x(n-1)]$ and represents the output of the channel from the combination of the previous x and p3 values, that is, x(n-1) and p3(n-1). The third term in Eq. 1 is $\beta g^*TF1^*[p1(n)$ and $p2(n)]$ and represents the output of the channel from the combination of the current p1 and p2 values through the unintended pathway 107. $\beta g^*TF1$ is assumed in this equation to be the same for p1(n) as p2(n), but it can be different. If different, p1(n) and p2(n) should be correlated the output data to calculate their respective coefficients. This is true as well for $\beta m^*TF2$. The fourth term in Eq. 1 is $\beta m^*TF2^*[p1(n-1)$ and $p2(n-1)]$ and represents the output of the channel from the combination of the previous p1 and p2 values through the unintended pathway 107. While Eq. 1 only references one previous sample (n-1), the equation is applicable for other previous samples (n-2), (n-3), etc.

Referring still to FIG. 1, the p1(n) and p2(n) values are provided to the correlator 120 as well as to the exclusive-OR logic 104. The channel output y(n) also is provided to the correlator 120. Collectively the correlator 120 and the corrector 130 operate to determine the input values x(n) from the channel output y(n). In Eq. 1 above, y(n) is known as well as p1(n), p1(n-1), p2(n), and p2(n-1). The values p3(n) and p3(n-1) are computed by the correlator 120 based on p1(n), p1(n-1), p2(n), and p2(n-1), and thus known. P3(n) is the result of exclusive-OR'ing p1(n) and p2(n), and p3(n-1) is the result of exclusive-OR'ing p1(n-1) and p2(n-1). Thus, to calculate x(n) from y(n) given Eq. 1, the values of $\alpha g$, $\alpha m$, $\beta g^*TF1$, and $\beta m^*TF2$ may need to be computed.

In some embodiments, the correlator 120 correlates y(n) with p3(n) to compute $\alpha g$. The value of p3(n) is included in only one term in Eq. (1) (i.e., $\alpha g^*p3(n)$). All other terms in Eq. (1) do not include p3(n) and thus, other than the term $\alpha g^*p3(n)$, y(n) is otherwise uncorrelated with p3(n). Thus, correlating y(n) with p3(n) will result in the determination of $\alpha g$. Similarly, the value of p3(n-1) is included in only one term in Eq. (1) (i.e., $\alpha m^*p3(n-1)$). All other terms in Eq. (1) do not include p3(n-1) and thus other than the term $\alpha m^*p3(n-1)$, y(n) is otherwise uncorrelated with p3(n-1). Thus, correlating y(n) with p3(n-1) will result in the determination of $\alpha m$. The term $\beta g^*TF1$ is similarly calculated by correlating y(n) with p1(n) (or p2(n)) to compute $\beta g^*TF1$. The term $\beta m^*TF2$ can be calculated by correlating y(n) with p1(n-1) (or p2(n-1)). In some embodiments, the correlator performs these correlations and computes the values of $\alpha g$, $\alpha m$, $\beta g^*TF1$, and $\beta m^*TF2$. The values of $\alpha g$, $\alpha m$, $\beta g^*TF1$, and $\beta m^*TF2$ then may be provided to the corrector as shown in FIG. 1.

The corrector 130 then corrects the channel output y(n) as:

$$y'(n)=y(n)-\beta g^*TF1^*[p1(n)+p2(n)]-\beta m^*TF2^*[p1(n-1)+p2(n-1)]-\alpha g^*p3(n)-\alpha m^*p3(n-1)$$ (Eq. 2)

$$y''(n)=y'(n)/\alpha g=x(n)+(\alpha m/\alpha g)^*x(n-1)$$ (Eq. 3)

$$y'''(n)=y''(n)-(\alpha m/\alpha g)^*y''(n-1)=x(n)+(\alpha m/\alpha g)^2{}^*x(n-2)$$ (Eq. 4)

where y'''(n) is the corrected channel output. The term y'(n) may be referred to herein as the first intermediate corrected value, and the term y''(n) may be referred to as the second intermediate corrected value. The x(n-2) coefficient may be small enough due to it being squared that, in some embodiments, this last term in Eq. (4) can be ignored $(\alpha m/\alpha g)^2{}^*x(n-2)$. The corrected channel output y'''(n) represents an estimate of the input data x(n). That is, the input data has been recalculated by correcting the channel output y(n) for gain and memory errors caused by the channel.

Figure 2:
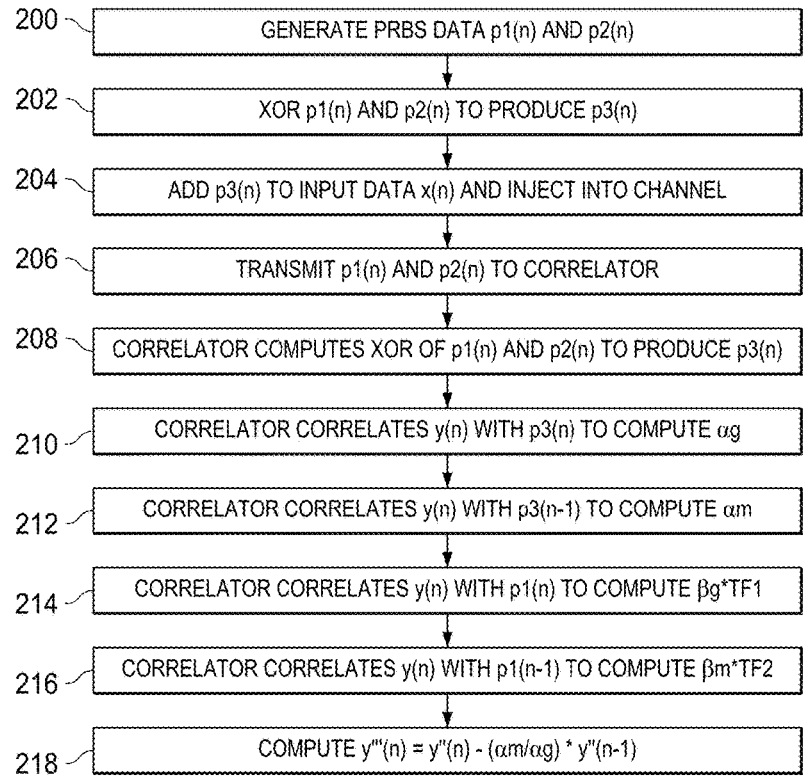
FIG. 2 shows a method in accordance with various examples.

FIG. 2 shows a flow chart depicting an example of a method in accordance with various embodiments. The operations may be performed in the order shown, or in a different order. Further, the operations may be performed sequentially, or two or more of the operations may be performed concurrently.

At 200, the method includes generating PRBS data p1(n) and p2(n). This operation may be performed using, for example, a linear feedback shift register as explained above. The p1(n) stream is generally uncorrelated to the p2(n) stream. At 202, the method includes computing the exclusive-OR of p1(n) and p2(n) to generate p3(n). Because p1(n) and p2(n) are uncorrelated, p(3) also is uncorrelated to either p1(n) or p2(n).

At 204, the method includes adding p3(n) to the input data x(n) and injecting the result into the channel. The initially generated values of p1(n) and p2(n) are also transmitted to the correlator 120 (operation 206). At 208, the correlator exclusive-OR's the received p1(n) with the received p2(n) to compute p3(n), which was injected into the channel along with the input data x(n). The correlator 120 then computes a series of correlations. At 210, the correlator 120 correlates the output of the channel, y(n), with p3(n) to compute $\alpha g$. At 212, the correlator 120 correlates y(n) with p3(n-1) to compute $\alpha m$. At 214, the correlator 120 correlates y(n) with p1(n) (or p2(n) to compute $\beta g^*TF1$. At 216, the correlator 120 correlates y(n) with p1(n-1) (or p2(n-1) to compute $\beta m^*TF2$.

The values of $\alpha g$, $\alpha m$, $\beta g^*TF1$, and $\beta m^*TF2$ then may be communicated from the correlator 120 to the corrector 130 and, at 218, the corrector generates the corrected output value y'''(n) as y''(n)-$(\alpha m/\alpha g)^*$y''(n-1)=x(n)+$(\alpha m/\alpha g)^2{}^*$x (n−2) (i.e., Eq. (4) above). Finally, the transmitted data x(n) can then be extracted from the corrected output y'''(n).

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
    a pseudorandom binary sequence (PRBS) generator configured to generate a first PRBS and a second PRBS;
    a logic circuit coupled to the PRBS generator and configured to generate a third PRBS from first PRBS and the second PRBS;
    a channel configured to receive input data combined with the third PRBS and to output channel output data;
    a correlator coupled to the PRBS generator and configured to receive the first PRBS and the second PRBS, reproduce the third PRBS using the received first PRBS and the received second PRBS, and correlate the output data from the channel to the reproduced third PRBS to compute a channel gain error and a channel memory error; and
    a corrector coupled to the correlator and configured to estimate the input data from the output data from the channel using the computed channel gain and memory errors.

2. The system of claim 1, wherein the logic circuit includes an exclusive-OR logic.

3. The system of claim 1, further including an adder configured to add the third PRBS to the input data to compute summed data for transmission across the channel.

4. The system of claim 1, wherein the PRBS generator includes a linear feedback shift register.

5. A method, comprising:
    generating a first pseudorandom binary sequence (PRBS);
    generating a second PRBS;
    generating a third PRBS using the first PRBS and the second PRBS;
    injecting the third PRBS into a channel along with input data;
    providing the first and second PRBS to a correlator;
    reproducing, by the correlator, the third PRBS using the provided first PRBS and the provided second PRBS;
    correlating the output data from the channel to the reproduced third PRBS to compute a channel gain error and a channel memory error; and
    correcting the output data from the channel using the computed channel gain error and channel memory error to estimate the input data.

6. The method of claim 5, wherein generating the third PRBS includes exclusive-OR'ing the first PRBS and the second PRBS.

7. The method of claim 5, wherein injecting the third PRBS into the channel along with the input data includes adding the third PRBS to the input data to produce a summed data and providing the summed data to the channel.

* * * * *